United States Patent [19] [11] 4,120,752
Ocken [45] Oct. 17, 1978

[54] MIXED OXIDE FUEL PELLET FOR FUEL ROD OF NUCLEAR REACTOR CORE

[75] Inventor: Howard Ocken, Palo Alto, Calif.

[73] Assignee: Electric Power Research Institute, Inc., Palo Alto, Calif.

[21] Appl. No.: 711,758

[22] Filed: Aug. 4, 1976

[51] Int. Cl.² .............................................. G21C 3/30
[52] U.S. Cl. ................................................ 176/73
[58] Field of Search ................. 176/17, 18, 68, 69, 176/72, 73

[56] References Cited

U.S. PATENT DOCUMENTS

| 3,297,539 | 1/1967 | Beckurts et al. | 176/18 X |
| 3,476,645 | 11/1969 | Turner | 176/17 X |
| 3,658,643 | 4/1972 | Spenke | 176/17 |
| 3,660,227 | 5/1972 | Ackyrod et al. | 176/17 |
| 3,704,202 | 11/1972 | Reeve et al. | 176/68 |
| 3,798,123 | 3/1974 | Lindemer | 176/68 X |
| 3,926,720 | 12/1975 | Hosegood | 176/18 |

Primary Examiner—Peter A. Nelson
Attorney, Agent, or Firm—Townsend and Townsend

[57] ABSTRACT

A fuel pellet comprised of an inner cylindrical part provided with a mixture of uranium oxide and plutonium oxide, and an outer annular part integral with the inner part and containing uranium oxide free of plutonium oxide. The fuel pellet is adapted to be inserted into a fuel rod with other such pellets in end-to-end relationship. The pellet is formed by cold pressing the uranium oxide and plutonium oxide in respective inner and outer parts, then sintering the parts to form a monolithic body with the two parts integral with each other.

6 Claims, 2 Drawing Figures

MIXED OXIDE FUEL PELLET FOR FUEL ROD OF NUCLEAR REACTOR CORE

This invention was made under contract with or supported by the Electric Power Research Institute, Inc.

This invention relates to improvements in the construction of mixed oxide fuel pellets for plutonium recycle applications for fuel rods of nuclear reactor cores and, more particularly, to an improved fuel pellet for protecting the structural integrity of a fuel rod in which the pellet is disposed.

BACKGROUND OF THE INVENTION

Mixed oxide fuel pellets of fuel rods of nuclear reactor cores are likely to be fabricated so that the plutonium oxide portion of the fuel is distributed throughout the entire pellet, including locations near the outer surface thereof. Large agglomerates of $PuO_2$ in the vicinity of the outer surface of the fuel pellet near the cladding of the fuel rod will cause local power spikes and this oftentimes results in local hot spots in the cladding. Of greater concern is the fact that large $PuO_2$ agglomerates will have a deleterious effect on cladding integrity during a severe power transient. The results obtained to date indicate that non-homogeneous mixed-oxide fuel rods can fail by a localized melting and perforation of the cladding of the fuel rod, followed by expultion of $PuO_2$ particles into the coolant. Such a response is clearly undesirable because the limiting design base accident for power reactors is established on the basis of maintaining cladding and fuel integrity during a power transient.

In view of the foregoing problems, a need exists to provide a fuel rod whose mixed-oxide fuel pellets do not cause a breakdown in the structural integrity of the fuel rod itself, yet assures that the fuel pellets in the rod are fabricated to meet rigid standards of $PuO_2$ particle homogeneity. Alternatively, a need exists for a fuel pellet that would intrinsically preclude the formation of large $PuO_2$ agglomerates in the outer region of the fuel pellet where such agglomerates have the greatest potential for deleterious effects during transient operation.

Prior art relating to this problem includes the following references:

1. Regulatory Staff, USAEC, Technical Report on Effects of Plutonium Utilization on the Performance of Light Water Reactors, WASH 1303, April 1974.
2. M. D. Freshley, et al, Behavior of Discrete Plutonium Dioxide Particles in Mixed-Oxide Fuel During Rapid Power Transients, Nucl. Tech., 15, 239 (1972).

SUMMARY OF THE INVENTION

The present invention is directed to an improved mixed oxide fuel pellet for plutonium recycle applications for insertion into a fuel rod of a nuclear reactor core wherein the fuel pellet is provided with two parts, namely, an inner, cylindrical part containing a mixture of $UO_2$ and $PuO_2$, and an outer, annular part surrounding the inner part, being integral with the inner part, and containing $UO_2$ but having no $PuO_2$ in it. Thus, the pellet provides a zone on the outer surface of the pellet which is free of $PuO_2$ so as to avoid the problems associated with localized melting and performation of the cladding of the fuel rod or the expulsion of $PuO_2$ particles into the coolant. Since the outer part is free of $PuO_2$, the latter cannot have agglomerates near the outer surface of the fuel pellet to cause the deleterious conditions mentioned above with respect to prior art fuel pellets.

The present invention also contemplates a fuel rod having a number of fuel pellets of the type described. The invention further contemplates the manufacture of the abovementioned fuel pellets so that both inner and outer parts can be fabricated, yet the inner part will have a generally homogeneous mixture of $UO_2$ and $PuO_2$, while the outer part will be free of $PuO_2$.

The primary object of this invention is to provide an improved fuel pellet for a fuel rod of a nuclear reactor core within the pellet is formed to provide an annular zone free of $PuO_2$ to minimize or substantially eliminate the undesirable effects due to localized melting and performation of the fuel pin outer shell due to the proximity of $PuO_2$ to thereby maintain the structural integrity of the fuel rod for a period equivalent to the useful life of the fuel pellet itself.

Another object of the present invention is to provide a fuel pellet of the type described wherein the fuel pellet has an inner part comprised of $UO_2$ and $PuO_2$ and an outer part surrounding the inner part and formed of $UO_2$ free of $PuO_2$ so that the outer part will isolate the inner part containing the $PuO_2$ from the cladding of the fuel pin to thereby avoid localized heating and performation of the cladding which would otherwise cause deterioration thereof.

Another object of this invention is to provide a fuel rod having a number of fuel pellets of the type described whereby the pellets will provide the necessary heat energy for a collant flowing past the fuel rod, yet the structural integrity of the fuel pin will be maintained at all times by virtue of the particular design of the fuel pellets themselves.

Still a further object of this invention is to provide a method of fabricating a fuel pellet of the type described wherein the inner and outer parts are pressed into the desired shape of the fuel pellet and then sintered to form a monolithic body in which the outer part is integral with the inner part but is free of $PuO_2$, while the inner part contains both $UO_2$ and $PuO_2$.

Other objects of this invention will become apparent as the following specification progresses, reference being had to the accompanying drawings for an illustration of the fuel pellet of this invention.

IN THE DRAWINGS

Figure 1:
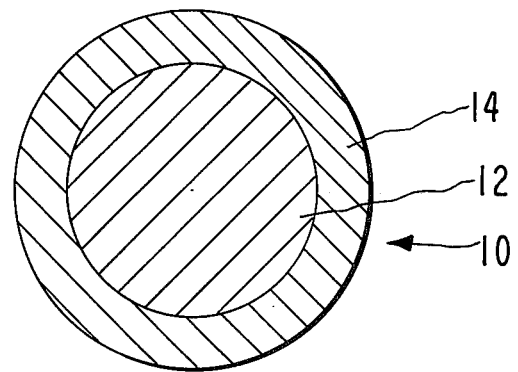
FIG. 1 is a top plan view of the fuel pellet of this invention.

The fuel pellet of this invention is broadly denoted by the numeral 10 and includes an inner, cylindrical part 12 and an outer, annular part 14 surrounding part 12 and being of substantially the same length as the latter. The typical length of the pellet is ½-inch to 1-inch; a typical range for the outer diameter of part 14 is 0.30-inch to 0.40-inch and a typical diameter is 0.36-inch. A typical range for the outer diameter of part 12 is 0.25-inch to 0.35-inch and a typical diameter is 0.31-inch. Parts 12 and 14 are of integral construction containing fuel of different physical characteristics.

The fuel content of part 12 includes both $UO_2$ and $PuO_2$; whereas, part 14 contains $UO_2$ but does not contain $PuO_2$. The compound $PuO_2$ appears in part 12 within the weight percentage range of about 3 to 6.

In forming pellet 10, blending and mixing of the $UO_2$ and $PuO_2$ powders is done in a manner to promote maximum dispersal of the two types of starting powders. The starting powder mixture will, therefore, be as homogeneous as possible prior to pellet pressing. Typically, after mechanically mixing and blending the appropriate weights of $UO_2$ and $PuO_2$ powders for each of parts 12 and 14, the fuel pellet is compacted by cold pressing and then is sintered at an elevated temperature to form the final shape of the pellet. During this pressing and sintering, the $PuO_2$ powders will not migrate into part 14; thus, part 14 will remain free of $PuO_2$.

Figure 2:
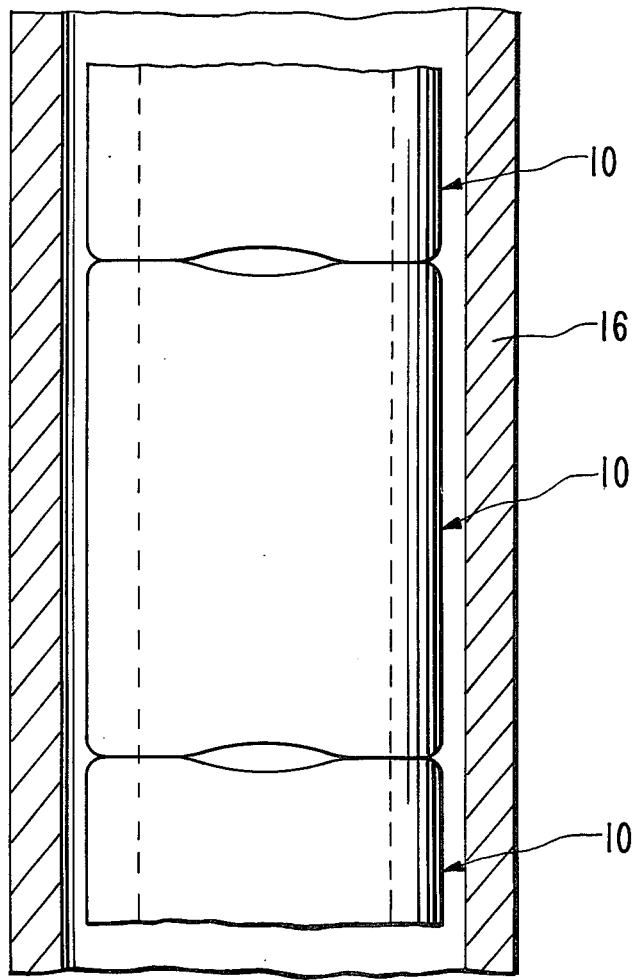
FIG. 2 is a vertical section through a fuel rod showing a number of the fuel pellets therewithin.

After formation, the pellet can be arranged without other pellets in a fuel rod 16 in the manner shown in FIG. 2 for use in the core of a nuclear reactor. Since inner part 12 is spaced from the cladding of the fuel rod, localized hot spots on the cladding or performation thereof by $PuO_2$ agglomerates is substantially eliminated.

I claim:

1. A mixed-oxide fuel pellet for a nuclear core fuel rod comprising: a body having an inner part and an outer part integral with and surrounding the inner part, the inner part containing a mixture of uranium oxide and plutonium oxide, the outer part containing uranium oxide free of plutonium oxide and having an exposed outer surface, the body being insertable into a fuel rod of a nuclear reactor with the outer surface of the outer part being contiguous to the inner surface of the rod.

2. A fuel pellet as set forth in claim 1, wherein the inner part is cylindrical and the outer part is annular.

3. A fuel pellet as set forth in claim 1, wherein the plutonium oxide is in the weight percentage range of 3 to 6 in the inner part.

4. A fuel pellet as set forth in claim 1, wherein the maximum transverse dimension of the inner part is in the range of 0.25-inch to 0.35-inch, and the thickness of the outer part is in the range of 0.03-inch to 0.07-inch.

5. A fuel rod for a nuclear reactor comprising: a tubular fuel rod cladding; and a plurality of fuel pellets within the rod body, each pellet having an inner part and an outer part integral with and surrounding the inner part, the inner part having a mixture of uranium oxide and plutonium oxide, and the outer part having uranium oxide free of plutonium oxide and provided with an exposed outer surface contiguous to the inner surface of the rod.

6. A fuel rod as set forth in claim 5, wherein the inner part is cylindrical and the outer part is annular.

* * * * *